Patented Dec. 12, 1939

2,183,487

UNITED STATES PATENT OFFICE 2,183,487

PROCESS OF BREAKING EMULSIONS

Ivor M. Colbeth, East Orange, N. J., assignor to The Baker Castor Oil Company, New York, N. Y., a corporation of New Jersey No Drawing. Original application April 6, 1934, Serial No. 719,293. Divided and this application June 17, 1938, Serial No. 214,314

8 Claims. (Cl. 196—4)

This invention relates to a process for controlling the relative surface tensions and interfacial adsorption between immiscible liquids to the end that emulsions of the liquids can be demulsified when desired. This is a division of my application Serial No. 719,293, filed April 6, 1934, now Patent No. 2,126,368 granted August 9, 1938.

By the present invention relative surface tensions or emulsification tendencies of immiscible liquids are changed by the addition of such substances that the surface tensions or emulsification tendencies of liquids capable of forming emulsions are brought sufficiently near each other to enable the emulsions to be broken when desired. The term "liquid" is intended to include solutions of solids in liquids. The term "emulsification tendency" is intended to include the various surface tensions and adsorption phenomena occurring at the interface.

Substances which can be used to control the surface tensions or emulsification tendencies of liquids to break emulsions when desired can be obtained by oxidizing or "blowing" castor oil and treating the "blown" oil with suitable chemicals. By "blowing" is meant heating the castor oil while passing air or an oxygen containing gas through it.

By this invention the surface tension of one liquid can be changed with respect to the surface tension of another liquid immiscible with it, or their relative emulsifying tendencies can be changed so that the emulsions break down. Breaking down of the emulsion may be due to the adsorption or dissolving of the protective colloid by the added substance or the equalizing of the emulsifying tendencies by the solution of the added substance in the continuous phase.

In carrying out this invention substances can be used for breaking emulsions, which substances are obtained by treating so-called mixed compounds known as aldehyde-acids with other compounds. The aldehyde-acid compounds are at the same time aldehydes and acids. The substances obtained from the aldehyde-acids for breaking the emulsion may be obtained from the aldehyde-acids by treating them with ammonia, or ammonia derivatives, such as aliphatic and aromatic amides and amines, or sodium bisulphite, or hydrocyanic acid, etc., which will react with aldehydes or the carbonyl group of the molecules, thus yielding amino compounds and addition products of the reagents added. These mixed compounds may also be treated with halogens, whereupon the aldehydes form halogen derivatives. The solubilities of these substances vary greatly, so that some of them are water soluble and others are water insoluble and various ones of them differ as to their solubilities in different immiscible liquids which form emulsions, such as oils and water, thus making it possible to vary the surface tension of constituents of emulsions and control the adsorption at the interface, thereby breaking the emulsions.

A convenient way to prepare the substances that are to be utilized in regulating the surface tensions or emulsification tendencies of immiscible liquids is to oxidize castor oil carefully at a temperature of about 150° F. to about 350° F. with air or ozone or ozonized air so that the aldehyde and peroxide content of the resulting oxidized oil will be as high as it is feasible to make it. In the claims where air is mentioned it is intended to include ozone or ozoned air. The oxidized products contain aldehyde-acids as well as polymerized fatty acids and polymerized oxidation products of fatty acids. These oxidized products may be treated with one or more of the aldehyde reactive compounds mentioned above which will react with them.

It has also been found that castor oil can be subjected to destructive distillation and the products thereby obtained can be oxidized or oxidized and modified, as described above and utilized as substances for breaking emulsions. Castor oil may be destructively distilled for this purpose at a temperature of about 390° F. to about 570° F. until a considerable portion of its weight has been lost.

It has been found suitable in many instances to continue the destructive distillation until about ⅕ of the weight of the oil is lost, although it is not necessary to carry the distillation to this extent. The time and temperature during the destructive distillation should be so regulated as to prevent a gel from being formed and also to prevent glycerine from being split off. For the purpose of oxidizing the residue it is preferable to use a temperature of about 220° F. while passing air therethrough.

When it is desired to break an emulsion, that substance is selected which will equalize or substantially equalize the emulsifying tendencies of the two liquids, or that substance is added which will adsorb the colloid present without itself being soluble in the continuous phase.

A simple test is usually sufficient in each instance to determine what substance is to be used for de-emulsifying as soon as it is known what liquids are present in emulsions already formed.

In preparing the products for carrying out this invention castor oil is rapidly heated to approximately 320° F. while air is being blown through the oil at a rate of about fifteen cubic feet of air per minute per thousand pounds of oil until the darkening which is noticeable at first begins to disappear. Ordinarily this will require about six hours. As soon as there has been a definite or decided bleaching of the oil it is then rapidly cooled to the temperature at which the final blowing or oxidizing operation is to be carried out. During the cooling an iron salt of an organic acid, such as acetic, oleic, linolic and practically any other, may be added. For example, iron ricinoleate is added as a catalyst to the oil in about one part per 200,000 by weight of the oil. This catalyst is added after the temperature has become low enough to avoid the danger of the catalyst being distilled over. It has been found that a temperature of about 285° F. is most desirable for carrying out the oxidation after the catalyst has been added, when iron ricinoleate is used as the catalyst, since, at temperatures much above this, the iron ricinoleate distils out of the oil, and at temperatures much below this its action is greatly weakened. Temperatures of about plus or minus 5° F. from 285° F. are about as wide limits as are practical with this catalyst. The time of treatment at approximately 285° F. varies in accordance with the amount of air that is blown through the oil and the intimacy of the contact of the air with the oil and also with the amount and nature of the catalyst present. The normal time required is usually about thirty hours.

Instead of using iron salts of organic acids, other metallic soaps, such as manganese, tin, mercury, nickel, cobalt, or any other metal radical which will show more than one valency, or which forms compounds with more than one valency, may be used. The catalytic effect seems to be dependent upon the metallic portion of the compound or soap and the soap may be produced directly from organic acids present in the castor oil by the addition of metallic oxides, hydroxides, etc.

Breaking emulsions

The following are given as specific examples of breaking emulsions, but it has been found that this invention is applicable to the breaking of many other emulsions.

*Example 1.*—Anhydrous ammonia gas was bubbled through castor oil oxidized as described above until it had become saturated.

One-tenth to two-tenths of 1% of this saturated product was added to an emulsion of brine and oil, which was a typical petroleum oil field emulsion. The mixture was intimately mixed and slightly warmed, after which it was allowed to settle over night, whereupon the emulsion separated into three layers. The top layer contained practically all of the mineral oil almost entirely free from water; the middle layer, which was quite thin compared to the other layers, contained mineral oil, water and the added substance; and the bottom layer contained practically all of the water with a very small amount of oil in it. The emulsified water had completely separated into a clear lower layer, leaving free mineral oil in a condition fit for direct refining. The very small amount of reagent needed was found in a thin layer between the water and oil layer constituting less than ½% of the oil layer.

*Example 2.*—Anhydrous $SO_2$ gas was bubbled through castor oil oxidized as described above until it had become saturated. The procedure described in Example 1 was followed and similar results were obtained.

*Example 3.*—The procedure described in Example 1 was followed except that the ammonia saturated oil was first dissolved in benzol and the solution used instead of the saturated product with results like those described in Example 1.

What is claimed is:

1. The process of breaking emulsions, which comprises mixing with emulsified liquids castor oil that has been bleached by oxidation at a temperature of about 320° F. and then oxidized by blowing air through it while the oil is at a temperature of approximately 285° F., said oxidation continuing until compounds are obtained that are both aldehydes and acids, said bleached and oxidized oil being unsaponified and being modified by treating it with an aldehyde reactive reagent.

2. The process of breaking emulsions, which comprises mixing with emulsified liquids castor oil that has been bleached by oxidation at a temperature of about 320° F. and then oxidized by blowing air through it while the oil is at a temperature of approximately 285° F. for about 30 hours, said bleached and oxidized oil being unsaponified and being modified by treating it with an aldehyde reactive reagent.

3. The process of breaking emulsions, which comprises mixing with emulsified liquids castor oil that has been bleached by oxidation at a temperature of about 320° F. and then oxidized by blowing air through it while the oil is at a temperature of approximately 285° F. in the presence of a metallic soap, said oxidation continuing until compounds are obtained that are both aldehydes and acids, said bleached and oxidized oil being unsaponified and being modified by treating it with an aldehyde reactive reagent.

4. The process of breaking emulsions, which comprises mixing with emulsified liquids castor oil that has been bleached by oxidation at a temperature of about 320° F. and then oxidized by blowing air through it while the oil is at a temperature of approximately 285° F. in the presence of an organic salt of iron, said oxidation continuing until compounds are obtained that are both aldehydes and acids, said bleached and oxidized oil being unsaponified and being modified by treating it with an aldehyde reactive reagent.

5. The process of breaking emulsions, which comprises mixing with emulsified liquids castor oil that has been bleached by oxidation at a temperature of about 320° F. and then oxidized by blowing air through it while the oil is at at temperature of approximately 285° F. until it contains an appreciable amount of aldehyde-acids and peroxides, said bleached and oxidized oil being unsaponified and being modified by treating it with an aldehyde reactive reagent.

6. The process of breaking emulsions, which comprises mixing with emulsified liquids castor oil that has been bleached by oxidation at a temperature of about 320° F. and then oxidized by blowing air through it while the oil is at a temperature of approximately 285° F., said oxidation continuing until compounds are obtained that are both aldehydes and acids, said bleached and oxidized oil being unsaponified and being modified by treating it with sodium bisulfite.

7. The process of breaking emulsions, which comprises mixing with emulsified liquids castor oil that has been bleached by oxidation at a temperature of about 320° F. and then oxidized by blowing air through it while the oil is at a temperature of approximately 285° F., said oxidation continuing until compounds are obtained that are both aldehydes and acids, said bleached and oxidized oil being unsaponified and being modified by treating it with ammonia.

8. The process of breaking emulsions, which comprises mixing with emulsified liquids castor oil that has been bleached by oxidation at a temperature of about 320° F. and then oxidized by blowing air through it while the oil is at a temperature of approximately 285° F., said oxidation continuing until compounds are obtained that are both aldehydes and acids, said bleached and oxidized oil being unsaponified and being modified by treating it with an aromatic amine.

IVOR M. COLBETH.